(12) United States Patent
Downey

(10) Patent No.: US 7,364,200 B2
(45) Date of Patent: Apr. 29, 2008

(54) VEHICLE SEATBELT RESTRAINING APPARATUS

(75) Inventor: Brian M. Downey, Westland, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 331 days.

(21) Appl. No.: 11/222,764

(22) Filed: Sep. 12, 2005

(65) Prior Publication Data
US 2007/0057501 A1 Mar. 15, 2007

(51) Int. Cl.
B60R 22/00 (2006.01)
(52) U.S. Cl. .................................. 280/801.1
(58) Field of Classification Search ............ 280/801.1, 280/801.2, 808; 297/468, 469, 482, 483
See application file for complete search history.

(56) References Cited

U.S. PATENT DOCUMENTS

| 4,091,508 | A | * | 5/1978 | Yamada et al. ............... 24/171 |
| 4,118,068 | A | * | 10/1978 | Fohl ............................. 297/481 |
| 4,611,854 | A | * | 9/1986 | Pfeiffer ....................... 297/468 |
| 4,915,413 | A | * | 4/1990 | Meyer ........................ 280/801.1 |
| 5,044,459 | A | | 9/1991 | Nishikaji |
| 5,332,261 | A | | 7/1994 | Siepierski |
| 6,276,721 | B1 | | 8/2001 | Romeo |
| 6,581,969 | B2 | * | 6/2003 | Nishide ..................... 280/801.1 |
| 6,830,406 | B2 | * | 12/2004 | Kim et al. ................... 403/120 |
| 7,229,135 | B2 | * | 11/2006 | Hyatt et al. ................. 297/481 |
| 7,178,876 | B2 | * | 2/2007 | Borgward et al. .......... 297/481 |

FOREIGN PATENT DOCUMENTS

EP 1283134 A1 2/2003
JP 55102748 A * 8/1980

OTHER PUBLICATIONS

Toyota Corolla Toyota Sprinter Service Manual for Type E-EE101, E-AE100, 101 and X-CE100 Jun. 1991.

* cited by examiner

Primary Examiner—Faye M. Fleming
(74) Attorney, Agent, or Firm—Global IP Counselors, LLP

(57) ABSTRACT

A vehicle structure is provided with a vehicle seatbelt restraining apparatus. The vehicle structure includes a lower vehicle portion and an upper vehicle portion. The vehicle seatbelt restraining apparatus includes a lower seatbelt anchor, an upper seatbelt anchor, a seatbelt webbing and a biasing element. The lower seatbelt anchor is pivotally coupled to the lower vehicle portion to move between a passenger securing orientation and a retracted non-use orientation. The upper seatbelt anchor is configured and arranged to be mounted to the upper vehicle portion. The seatbelt webbing has a first end coupled to the lower seatbelt anchor and a second end coupled to the upper seatbelt anchor. The biasing element is operatively coupled to the lower seatbelt anchor to urge the lower seatbelt anchor into the retracted non-use orientation.

22 Claims, 9 Drawing Sheets

VEHICLE SEATBELT RESTRAINING APPARATUS

BACKGROUND OF THE INVENTION

1. Field of the Invention

The present invention generally relates to a vehicle seatbelt restraining apparatus. More specifically, the present invention relates to a seatbelt restraining apparatus that includes a lower section that is spring biased to return to a non-use orientation when the seatbelt is not in use.

2. Background Information

In recent years, seatbelt webbing apparatuses have been used in vehicles, one seatbelt webbing apparatus for each passenger. Such a seatbelt webbing apparatus typically includes first and second ends of the seatbelt webbing that are anchored to respective lower and upper portions of a vehicle structure adjacent to an outboard side of the seat. A latch slidably disposed on the webbing is configured to removably latch to a buckle mechanism fixed to an inboard side of the seat. Such seatbelts typically include a retracting mechanism at the upper portion of the vehicle structure. When the seatbelt is unbuckled, the retracting mechanism draws at least a portion of the webbing around a spindle within the retracting mechanism. When the webbing apparatus is in use, seatbelt webbing is drawn out of the retracting mechanism and extends over both the waist region and the upper torso of the passenger. This configuration securely restrains the passenger against rapid movement of the upper torso and the waist of the passenger in the event of a collision.

The lower end of the seatbelt webbing is typically secured to either the floor or sill of the vehicle by an appropriately dimensioned fastener. The lower end of the seatbelt webbing typically pivots about the fastener. A problem arises from this configuration of the seatbelt webbing assembly in that the lower end of the seatbelt webbing sometimes becomes wrinkled and/or orients itself in such a manner that retraction of the webbing into the retracting mechanism is hampered. This condition is unsightly and can make subsequent use of the seatbelt webbing difficult if the webbing has become tangled.

Non-retracted seatbelt webbing can be a particular nuisance in coupes. Coupes typically only have two passenger doors, one on each side of the vehicle. In a coupe, an upright portion of the front seat typically pivots forward allowing a passenger to enter or exit a rear seat within the vehicle. If the webbing for a front seatbelt fails to retract properly within the retracting mechanism, then movement in and out of the rear seat may be hampered by the non-retracted portions of the seatbelt webbing.

In view of the above, it will be apparent to those skilled in the art from this disclosure that there exists a need for an improved seatbelt arrangement that allows for reliable retraction of the seatbelt webbing, particularly in a coupe. This invention addresses this need in the art as well as other needs, which will become apparent to those skilled in the art from this disclosure.

SUMMARY OF THE INVENTION

It has been discovered that with a lower section of a seatbelt webbing positioned in a generally upright orientation when not in use, an upper section of the seatbelt webbing can more effectively be wound within a retracting mechanism.

One object of the present invention is to bias a lower section of a seatbelt webbing into an orientation that facilitates improved retraction of the seatbelt webbing into a retracting mechanism.

In order to achieve the objects of the present invention, a vehicle structure is provided with a vehicle seatbelt restraining apparatus. The vehicle structure includes a lower vehicle portion and an upper vehicle portion. The vehicle seatbelt restraining apparatus includes a lower seatbelt anchor, an upper seatbelt anchor, a seatbelt webbing and a biasing element. The lower seatbelt anchor is pivotally coupled to the lower vehicle portion to move between a passenger securing orientation and a retracted non-use orientation. The upper seatbelt anchor is configured and arranged to be mounted to the upper vehicle portion. The seatbelt webbing has a first end coupled to the lower seatbelt anchor and a second end coupled to the upper seatbelt anchor. The biasing element is operatively coupled to the lower seatbelt anchor to urge the lower seatbelt anchor and the lower end of the seatbelt webbing into the retracted non-use orientation.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
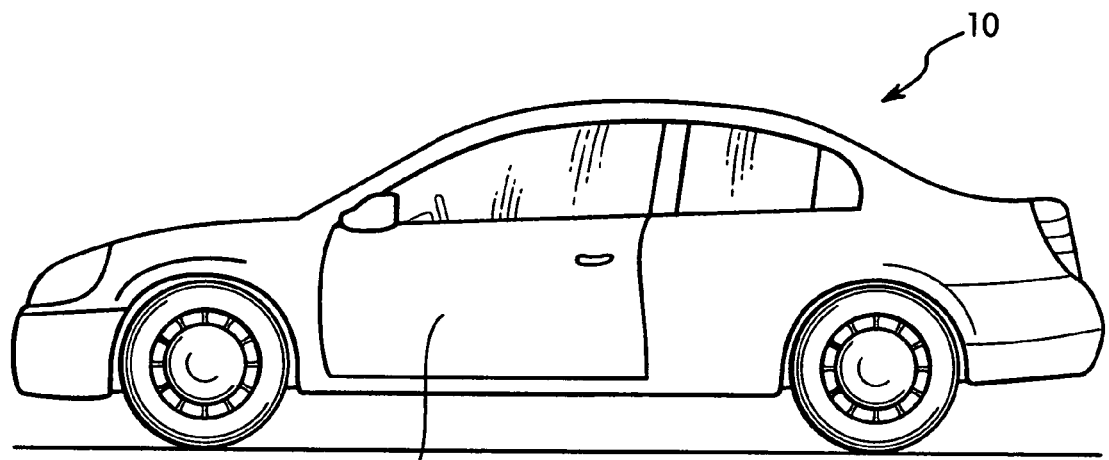
FIG. 1 is a side elevational view of a vehicle that includes a seatbelt restraining apparatus in accordance with the present invention.
Figure 2:
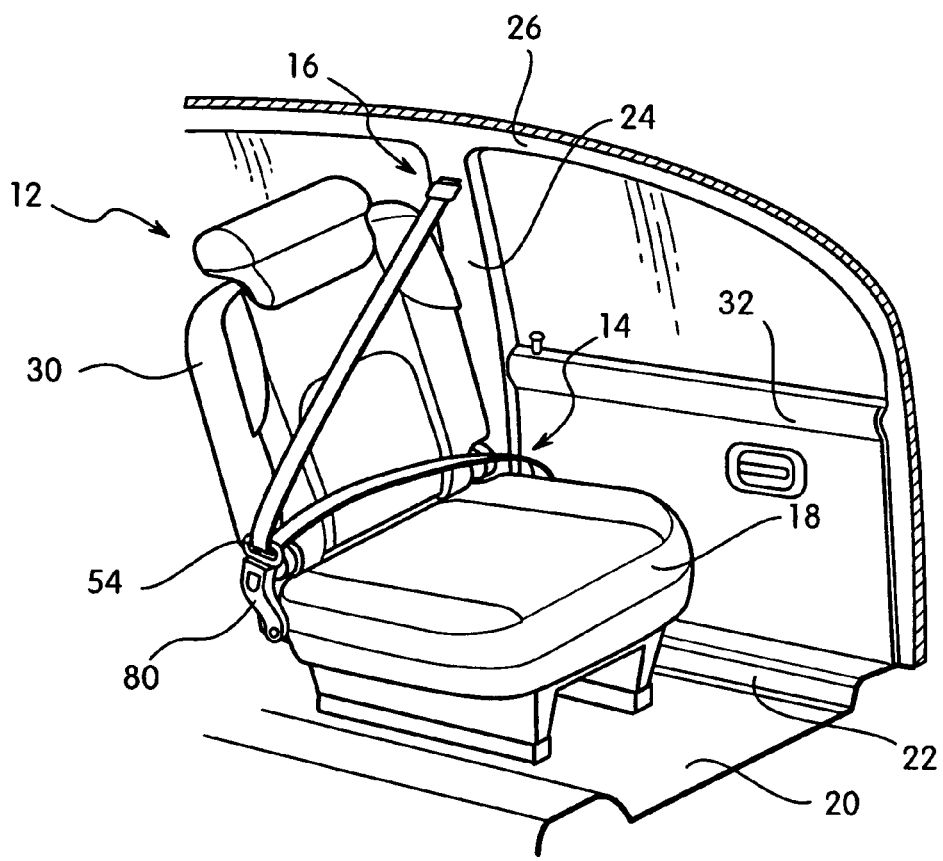
FIG. 2 is a simplified partial perspective view of an interior portion of the vehicle depicted in FIG. 1 showing the seatbelt restraining apparatus having a lower section and an upper section in accordance with a first embodiment of the present invention.

Referring initially to FIGS. 1 and 2, a vehicle 10 is illustrated that includes a vehicle seatbelt restraining apparatus 12 in accordance with a first embodiment of the present invention. The vehicle seatbelt restraining apparatus 12 includes a lower section 14 and an upper section 16. In the preferred embodiment, the lower section 14 is coupled to the vehicle 10 with spring biasing that urges the lower section 14 in a rotational direction about a pivot axis A (FIG. 3) from an inclined passenger securing orientation to a generally upright retracted non-use orientation.

The vehicle 10 includes several seats, such as the front seat 18 depicted in FIG. 2. Preferably, each seat, such as the front seat 18, includes one corresponding vehicle seatbelt restraining apparatus 12. Only one vehicle seatbelt restraining apparatus 12 is described herein for the sake of brevity. However it should be understood from the drawings and description herein that the following description of the vehicle seatbelt restraining apparatus 12 applies to multiple inclusions of the vehicle seatbelt restraining apparatus 12 within a single vehicle 10.

The vehicle 10 depicted in FIG. 1 is a two-door coupe. However, the vehicle 10 can be a four door sedan, a pick-up truck, van or SUV. The vehicle seatbelt restraining apparatus 12 of the present invention can be installed in any of a variety of vehicles. The vehicle 10 basically includes the seat 18, a floor 20, a sill 22, a pillar 24 and a roof rail 26, all of which at least partially define a vehicle structure. The floor 20, the sill 22 and a lower portion of the pillar 24 define a lower portion of the vehicle structure of the vehicle 10. The roof rail 26 and an upper portion of the pillar 24 define an upper portion of the vehicle structure of the vehicle 10. As shown in FIG. 2, the front seat 18 is fixedly attached to the floor 20.

The vehicle 10 further includes a door 32 adjacent to the seat 18 that allows entry and exiting in and out of the vehicle 10. The seat 18 includes an upper portion 30 that supports the upper body of the passenger (not shown) within the vehicle 10. Since the vehicle 10 depicted in FIG. 1 is coupe, the upper portion 30 of the seat 18 is preferably configured to pivot forward to allow passengers in and out or a back seat (not shown).

Figure 3:
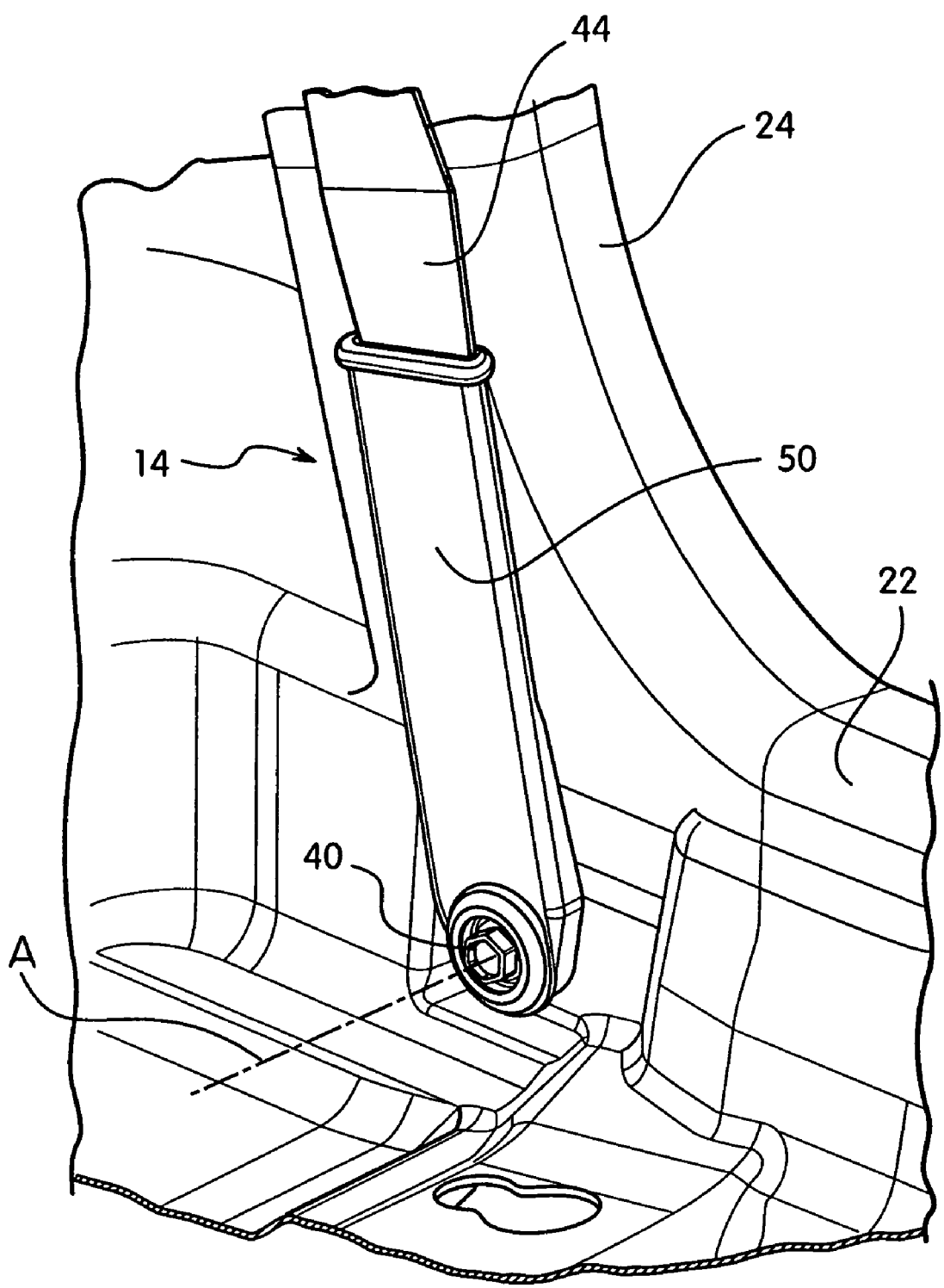
FIG. 3 an enlarged partial perspective view of the lower section of the seatbelt restraining apparatus in accordance with the first embodiment of the present invention.
Figure 6:
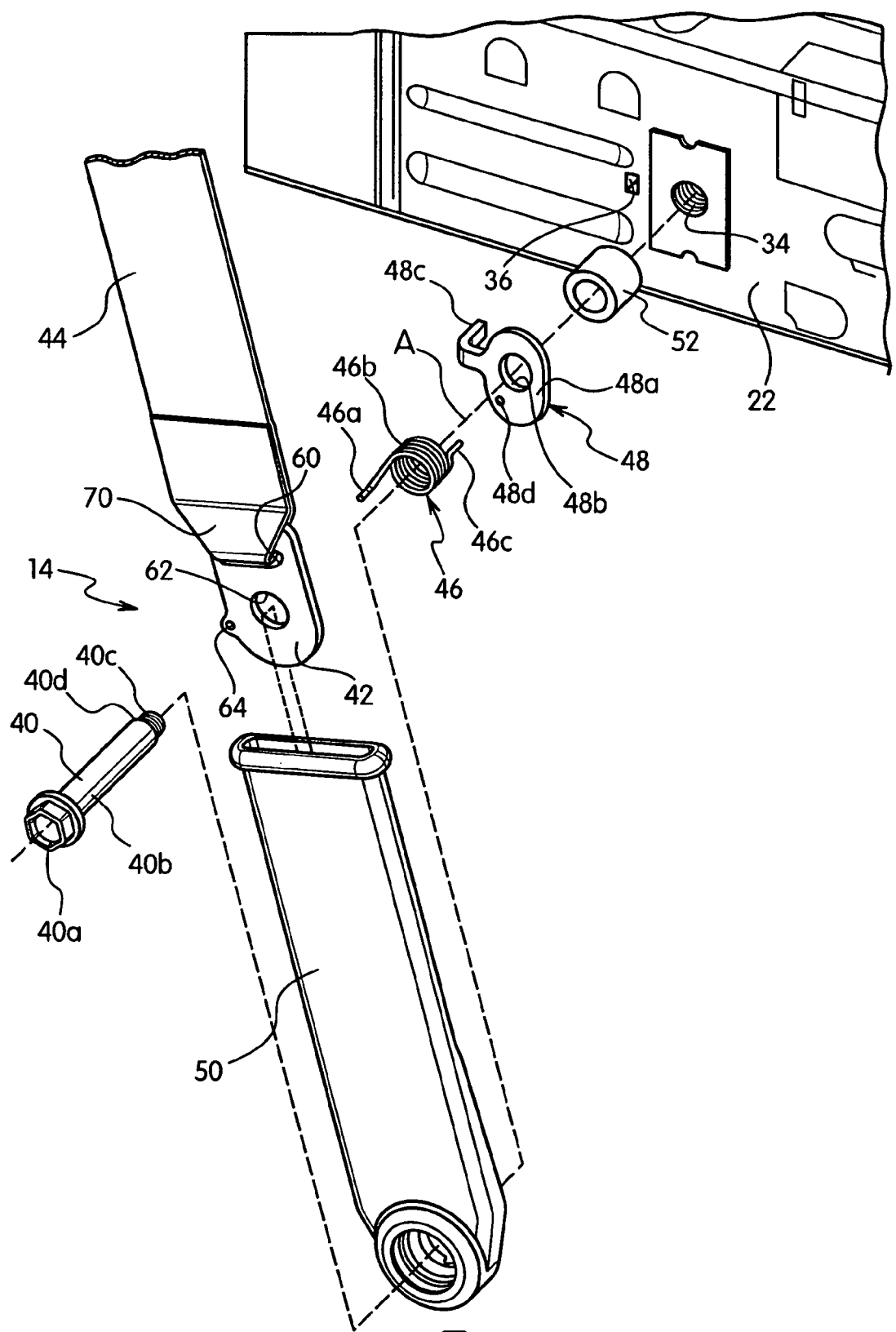
FIG. 6 is an exploded partial perspective view of the lower section of the seatbelt restraining apparatus showing the various elements of the seatbelt restraining apparatus shown in phantom in accordance with the first embodiment of the present invention.

The sill 22 is preferably an elongated member that extends beneath the door 32, as shown in FIGS. 2 and 3. As is shown in FIG. 6, the sill 22 is formed with a threaded aperture 34 and a restraining portion 36. The threaded aperture 34 has a central axis that defines the axis of rotation A, as is described in greater detail below. The restraining portion 36 is preferably an indentation, a recess or a hole that is formed in the sill 22 slightly spaced apart from the threaded aperture 34.

Figure 7:
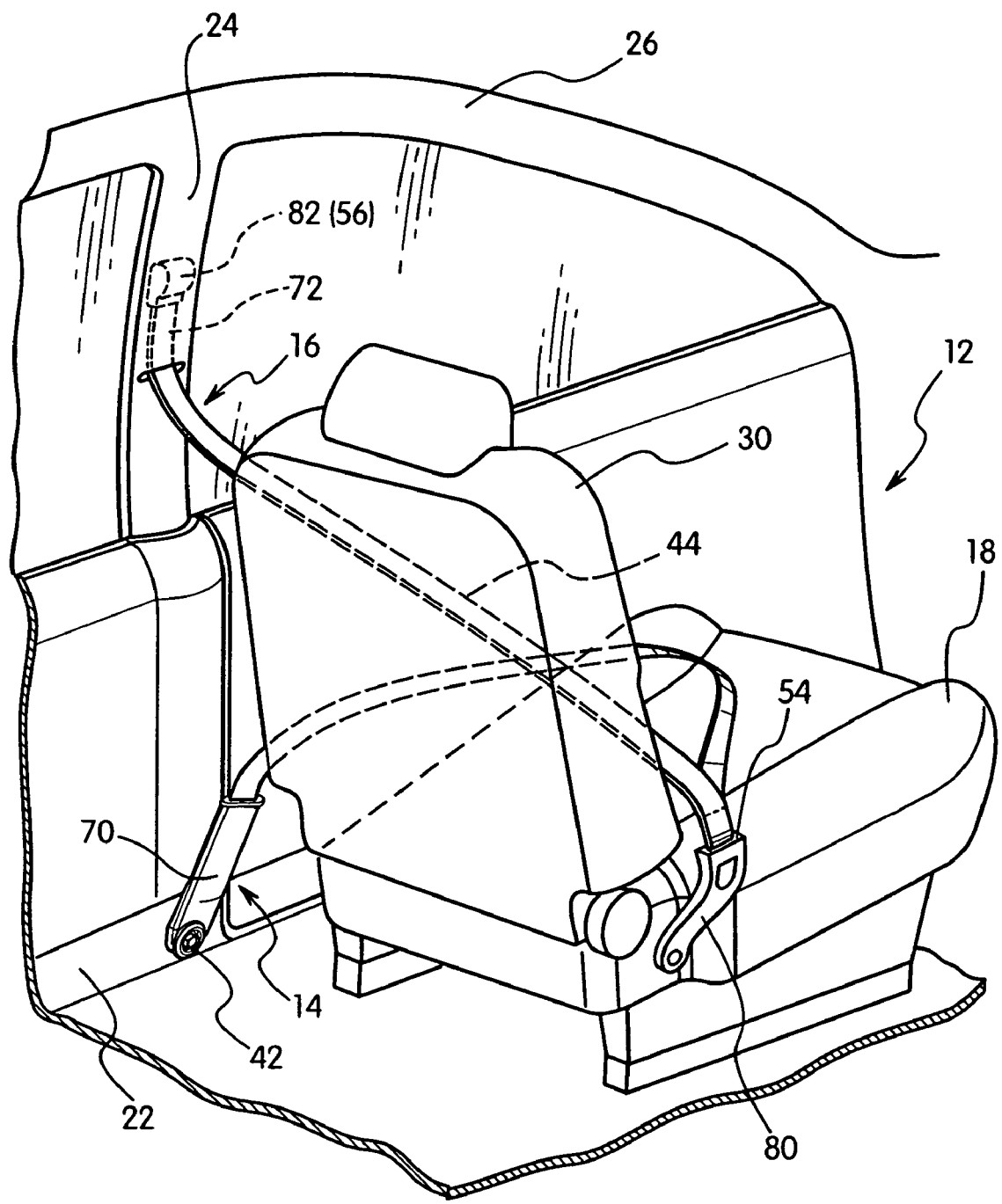
FIG. 7 is a partial perspective view of the seatbelt restraining apparatus showing both the upper section and the lower section and their relationship to a seat within the vehicle in accordance with the first embodiment of the present invention.
Figure 8:
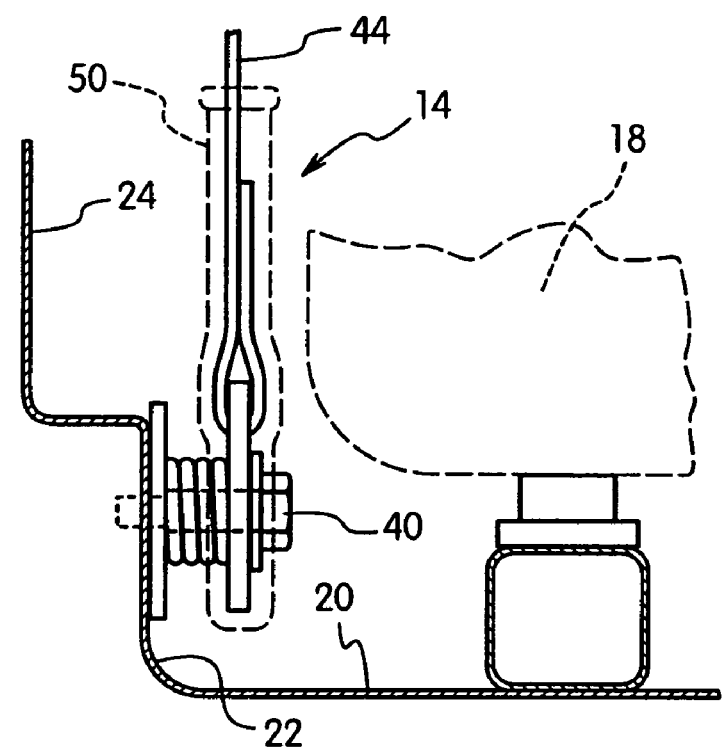
FIG. 8 is a partial rear elevational view of the lower section of the seatbelt restraining apparatus showing attachment between a sill portion of the vehicle and the lower section of the seatbelt restraining apparatus in accordance with the first embodiment of the present invention.

As shown in FIG. 6, the lower section 14 of the vehicle seatbelt restraining apparatus 12 basically includes a fastener 40, a lower seatbelt anchor 42, an elongated seatbelt webbing 44, a biasing element 46, a spring mounting member 48, a webbing sleeve 50, a spacer 52, a latch plate 54 (FIGS. 2 and 7) and an upper seatbelt anchor 56 (FIGS. 2 and 8). The lower seatbelt anchor 42, a lower portion of the seatbelt webbing 44, the biasing element 46, the spring mounting member 48, the webbing sleeve 50 and the spacer 52 generally define the lower section 14 of the vehicle seatbelt restraining apparatus 12. The upper seatbelt anchor 56 and an upper portion of the seatbelt webbing 44 generally define the upper section 16 of the vehicle seatbelt restraining apparatus 12.

The fastener 40 basically includes a head portion 40a, a shaft portion 40b, a threaded portion 40c and a shoulder 40d. The shaft portion 40b has a generally cylindrically shaped. The threaded portion 40c is shaped and dimensioned to thread into the threaded aperture 34 in the sill 22. The shoulder 40d is formed between the shaft portion 40b and the threaded portion 40c and is dimensioned to contact the sill 22 as the threaded portion 40c is tightened into the threaded aperture 34.

The lower seatbelt anchor 42 is preferably a generally flat plate-like member that basically includes a first seatbelt attachment portion 60, a mounting aperture 62 and a spring retaining aperture 64. The first seatbelt attachment portion 60 is dimensioned to receive and secure the seatbelt webbing 44, as is described in greater detail below. The mounting aperture 62 is dimensioned to receive the fastener 40.

Figure 4:
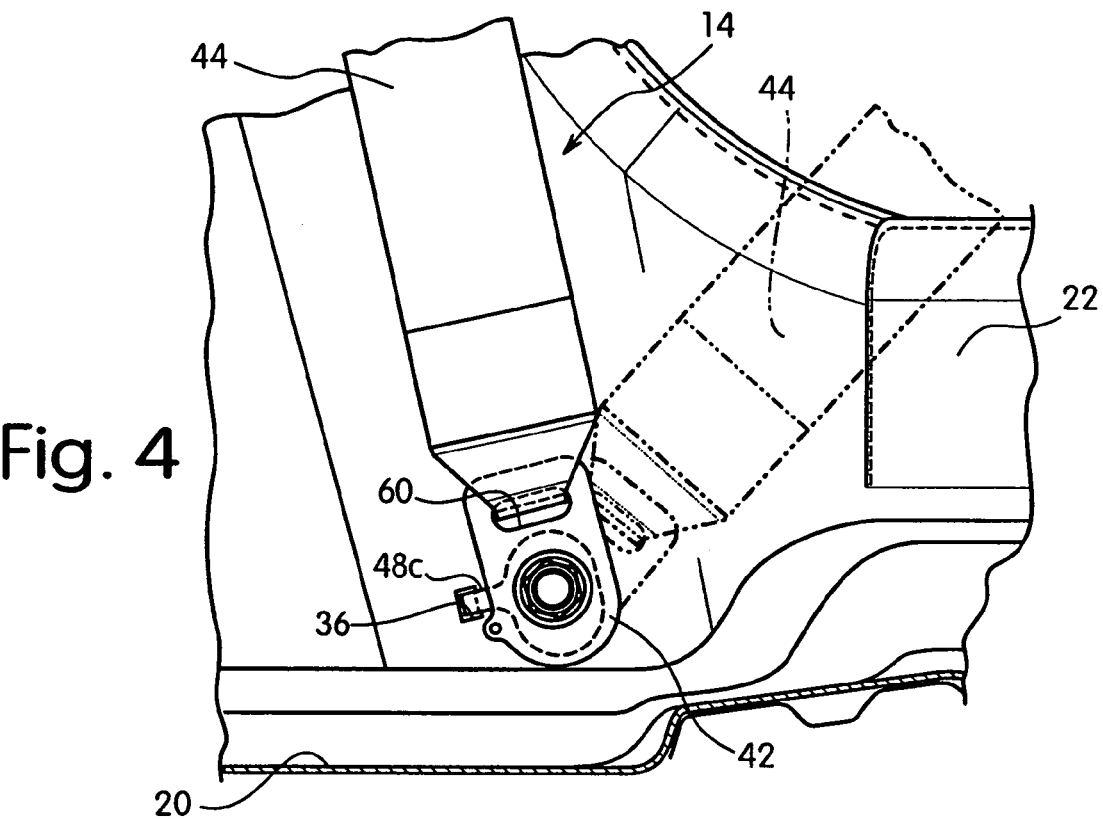
FIG. 4 is an enlarged partial side elevational view of the lower section of the seatbelt restraining apparatus with the lower section shown in solid lines in a retracted non-use orientation and in dashed lines in an in-use orientation in accordance with the first embodiment of the present invention.
Figure 5:
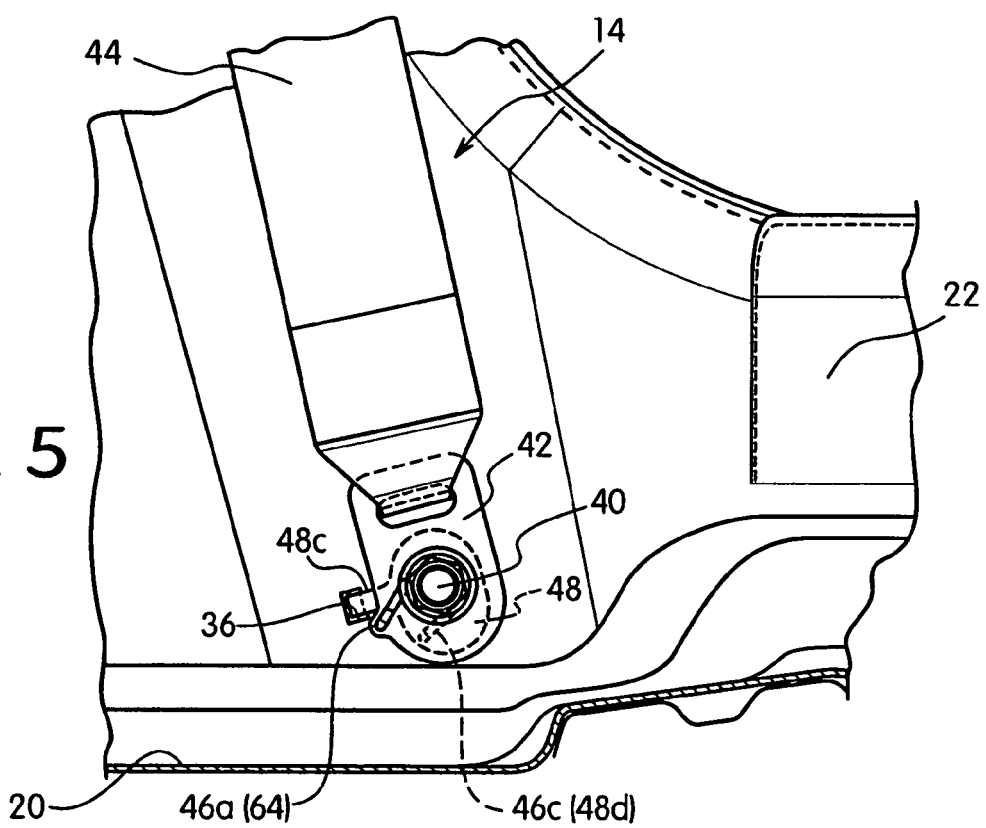
FIG. 5 is another enlarged partial side elevational view of the seatbelt restraining apparatus with various elements of the seatbelt restraining apparatus shown in phantom in accordance with the first embodiment of the present invention.

In the first embodiment depicted in FIGS. 3 and 4, the lower seatbelt anchor 42 is pivotally coupled to the sill 22 by the fastener 40. More specifically, the lower seatbelt anchor 42 pivots about the shaft portion 40b of the fastener 40 for movement between a passenger securing orientation shown in dashed lines in FIG. 4 and a retracted non-use orientation shown in solid lines in FIGS. 3, 4 and 5. Further, the lower seatbelt anchor 42 is configured and arranged to be substantially aligned with the pillar 24 when in the retracted non-use orientation, as indicated in FIGS. 3, 4 and 5.

The seatbelt webbing 44 is a conventional material that extends between the lower seatbelt anchor 42 and upper seatbelt anchor 56, as shown in FIG. 7. More specifically, the elongated seatbelt webbing 44 includes a first end 70 and a second end 72. The first end 70 is fixedly attached to the first seatbelt attachment portion 60 of the lower seatbelt anchor 42. The attachment between the first end 70 of the seatbelt webbing 44 is accomplished in a conventional manner. For instance, the first end 70 of the seatbelt webbing 44 can be riveted, bolted or fixed by other fasteners to the first seatbelt attachment portion 60. Alternatively, the first end 70 of the seatbelt webbing 44 can be woven into a loop that extends through the first seatbelt attachment portion 60 thereby forming a secure coupling therebetween, as shown in FIG. 6. The second end 72 of the seatbelt webbing 44 is coupled in a conventional manner to the upper seatbelt anchor 56.

The biasing element 46 is operatively coupled to the lower seatbelt anchor 42 to urge the lower seatbelt anchor 42 into the retracted non-use orientation. More specifically, the biasing element 46 is operatively coupled between the lower seatbelt anchor 42 and the sill 22 of the vehicle 10 to urge the lower seatbelt anchor 42 in a rotational direction about the pivot axis A from the passenger securing orientation to the retracted non-use orientation relative to the sill 22 of the vehicle 10.

The biasing element 46 is preferably a coil spring. The biasing element 46 basically includes a first end 46a, a coiled portion 46b and a second end 46c. The coiled portion 46b is dimensioned and configured to be disposed around the shaft portion 40b of the fastener 40. The first end 46a is operatively engaged with the lower seatbelt anchor 42. Specifically, the first end 46a extends into the spring retaining aperture 64 of the lower seatbelt anchor 42. The second end 46c of the biasing element is operatively engaged with the spring mounting member 48 and coupled to the sill 22 of the vehicle 10, as is described in greater detail below.

The spring mounting member 48 is arranged and configured to non-rotatably engage the sill 22 of the vehicle 10 and retain the biasing element 46 thereon. The spring mounting member 48 basically has a generally planar body portion 48a with a mounting opening 48b configured to have the fastener 40 extend therethrough, a protrusion 48c extending from the body portion 48a and a spring receiving aperture 48d. The protrusion 48c is angularly offset from the body portion 48a such that the protrusion 48c is configured to non-rotatably engage the restraining portion 36 in the sill 22 of the vehicle 10. The aperture 48d is dimensioned to receive the second end 46c of the biasing element 46 such that the second end 46c of the biasing element 46 is non-rotatably coupled to the spring mounting member 48 and the sill 22. Hence, the spring mounting member 48 is non-rotatably coupled to the sill 22 of the vehicle 10, with the biasing element 46 being operatively disposed between the spring mounting member 48 and the lower seatbelt anchor 42.

It should be understood from the drawings and the description herein that the protrusion 48c is configured to engage the restraining portion 36 in the sill 22 such that the spring mounting member 48 is prevented from rotating relative to the sill 22. Any of a variety of configurations can be utilized to effect the non-rotatable engagement between the protrusion 48c and the restraining portion 36 in the sill 22. As mentioned above, the restraining portion 36 can be an aperture or opening that receives the protrusion 48c. Alternatively, the restraining portion 36 can be a recess, shoulder or projection that engages the protrusion 48c and prevents the spring mounting member 48 from rotating relative to the sill 22.

The webbing sleeve 50 is an optional element that can be fitted over the lower seatbelt anchor 42 and a portion of the seatbelt webbing 50, as shown in FIGS. 2 and 6. The webbing sleeve 50 is a generally hollow sleeve that is formed with a pair of apertures allowing access to the fastener 40 and allowing the shaft portion 40b of the fastener 40 to extend to the sill 22. The webbing sleeve 50 is a flexible element that fits over the lower seatbelt anchor 42 and a portion of the seatbelt webbing 50 much like a glove. However the webbing sleeve 50 is preferably has sufficient rigidity to maintain the portions of the seatbelt webbing 44 therein to remain in a generally planar orientation. It should be understood that in FIGS. 4 and 5, the seatbelt webbing 44 has been removed in order to show other elements with greater clarity. In FIG. 8 the webbing sleeve 50 is depicted in phantom in order to show other elements with greater clarity.

The spacer 52 is an optional element that can be fitted around the shaft portion 40a of the fastener 40 between the sill 22 and the spring mounting member 48. The spacer 52 establishes a predetermined distance between the sill 22 and the spring mounting member 48.

As shown in FIGS. 2 and 7, the latch plate 54 is slidably attached in a conventional manner to the seatbelt webbing 44, and configured to be releasably coupled to a seatbelt buckle 80 on the seat 18. The seatbelt buckle 80 is disposed on an inboard side of the seat 18.

As shown in FIGS. 2 and 7, the upper seatbelt anchor 56 is configured and arranged to be mounted to the pillar 24 of the vehicle 10. The upper seatbelt anchor 56 includes a seatbelt retractor 82 that is fixedly attached to the pillar 24, as shown in FIG. 7.

As indicated in FIG. 6, the vehicle seatbelt restraining apparatus 12 is fixed to the sill 22 of the vehicle 10 by the fastener 40. Specifically, the fastener 40 is installed with the shaft portion 40b extending through the mounting aperture 64 of the lower seatbelt anchor 42, through the coiled portion 46b of the biasing element 46, through the mounting opening 48b of the spring mounting member 48, through the spacer 52 and finally into the threaded aperture 34 in the sill 22. The threaded portion 40c of the fastener 40 threads into the threaded aperture 34 in the sill 22 to securely hold the fastener 40 in place relative to the sill 22. However, as shown in FIG. 6, the threaded portion 40c has a limited number of threads. Once the threaded portion 40c has threaded completely into the threaded aperture 34, the unthreaded surface of the shaft portion 40b of the fastener 40 limits further torquing of the fastener 40. The shaft portion 40b is longer than the combined thicknesses of the spacer 52, the spring mounting member 48, the biasing element 46 and the lower seatbelt anchor 42. Therefore, the lower seatbelt anchor 42 can pivot on the shaft portion 40b of the fastener 40 in response to the biasing of the biasing element 46 and human intervention.

Second Embodiment

Figure 9:
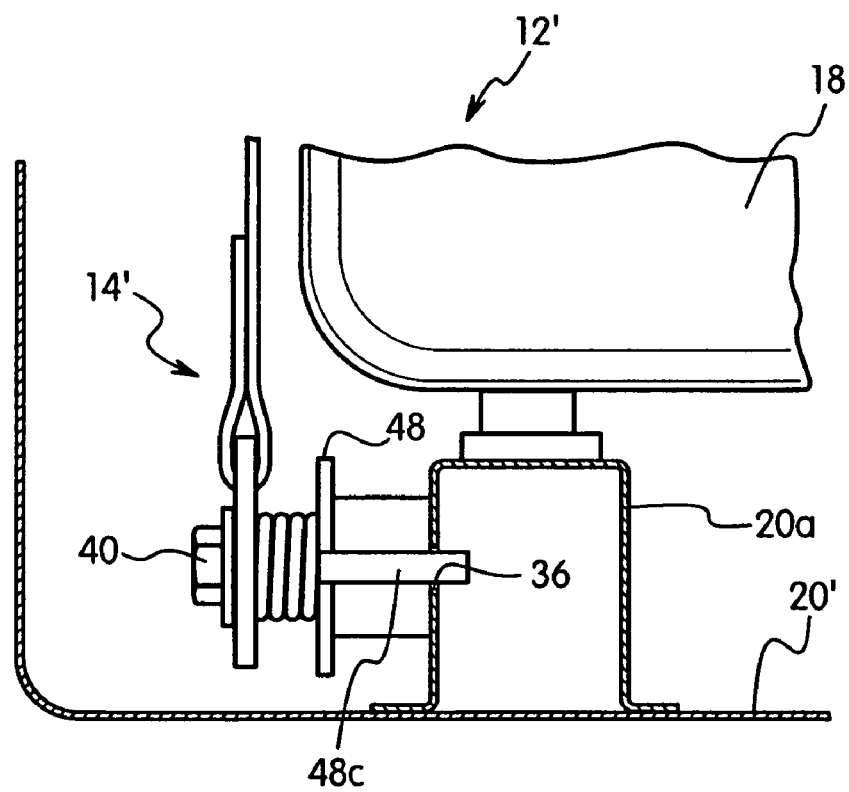
FIG. 9 is a partial rear elevational view of the lower section of the seatbelt restraining apparatus showing attachment between a floor portion of the vehicle and the lower section of the seatbelt restraining apparatus in accordance with a second embodiment of the present invention.

Referring now to FIG. 9, a vehicle seatbelt restraining apparatus 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (') or be provided with a new reference numeral.

In the second embodiment, the lower section 14 of the vehicle seatbelt restraining apparatus 12' is fixed to a floor section 20a of the floor 20', not to the sill 22. Specifically, the fastener 40 is fixed to the floor section 20a. The floor section 20a is a projection formed on the floor 20' under the seat 18, as shown in FIG. 9. Further, the protrusion 48c of the spring mounting member 48 extends into a restraining portion 36' formed in the floor section 20a.

Alternatively, the floor section 20a can be integrally formed with the floor 20'

Third Embodiment

Figure 10:
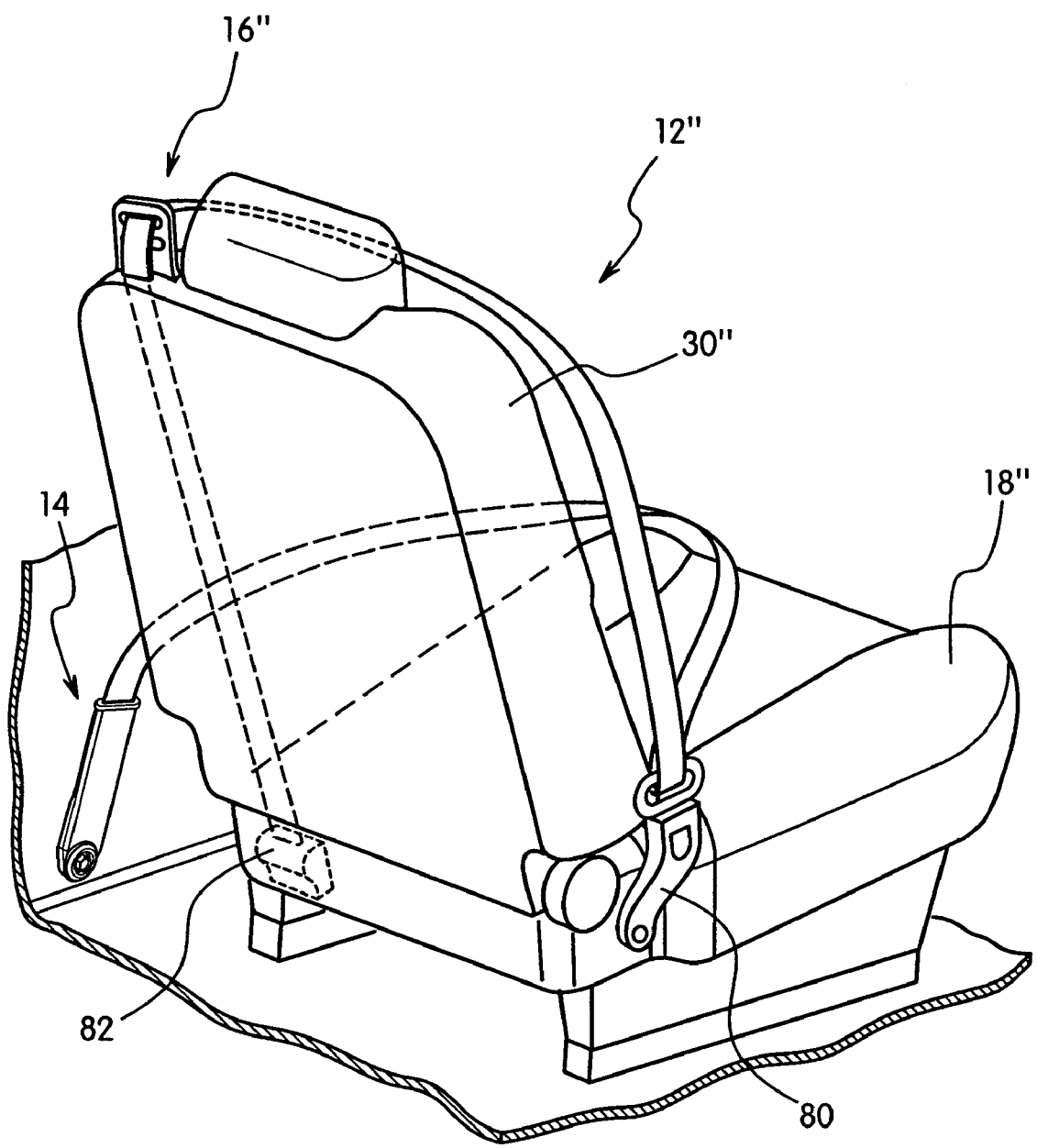
FIG. 10 is a partial rear perspective view of the seatbelt restraining apparatus showing attachment between the seat of the vehicle and the upper section of the seatbelt restraining apparatus in accordance with a third embodiment of the present invention.

Referring now to FIG. 10, a vehicle seatbelt restraining apparatus 12" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, an upper section 16" of the vehicle seatbelt restraining apparatus 12" is fixed to a portion of the upper portion 30" of the seat 18", not to the pillar 26. Further, the seatbelt retractor 82 is hidden within the seat 18".

Fourth Embodiment

Figure 11:
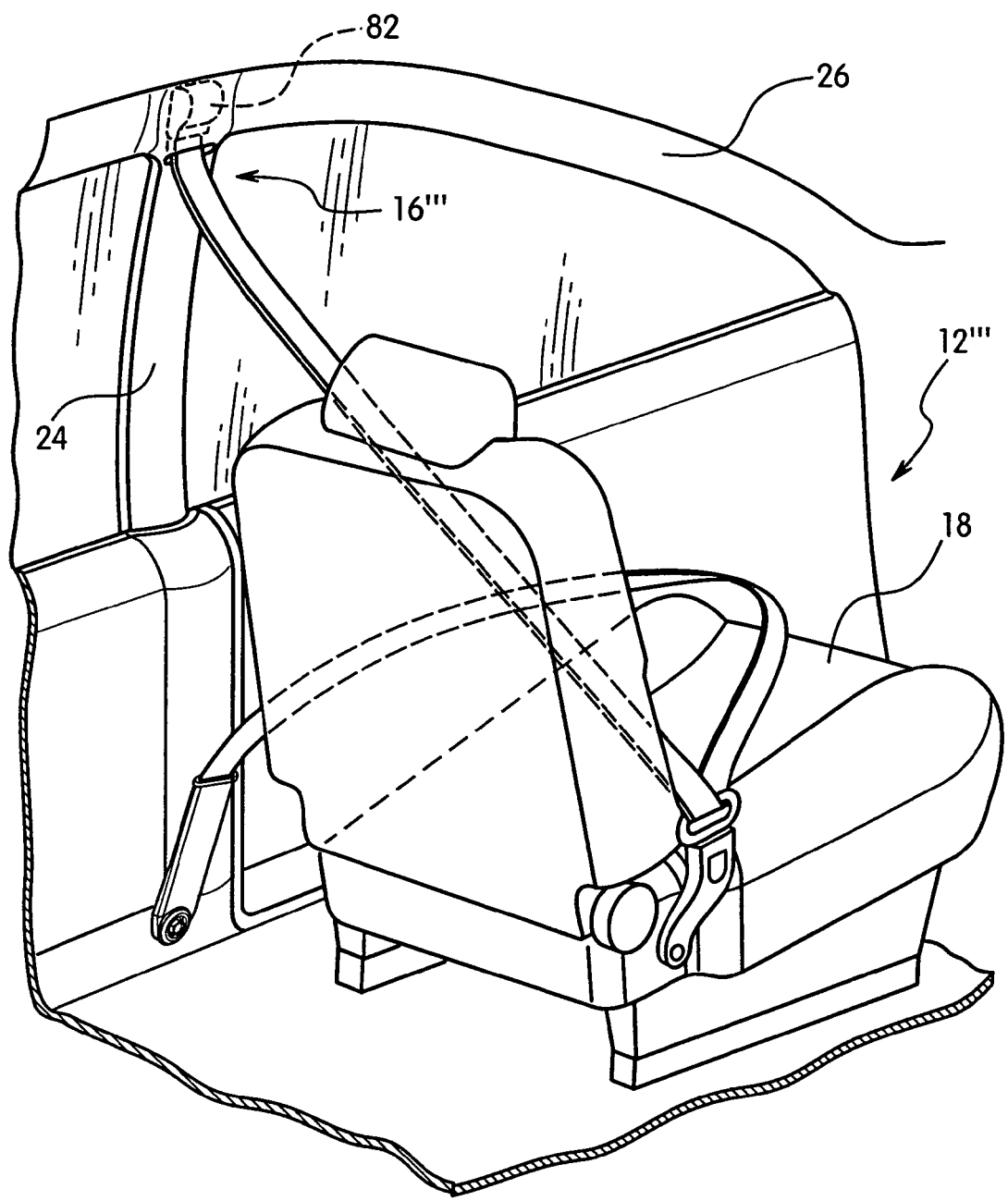
FIG. 11 is a partial rear perspective view of the seatbelt restraining apparatus showing attachment between a roof rail portion of the vehicle and the upper section of the seatbelt restraining apparatus in accordance with a fourth embodiment of the present invention.

Referring now to FIG. 11, a vehicle seatbelt restraining apparatus 12''' in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a triple prime (''').

In the fourth embodiment, an upper section 16''' of the vehicle seatbelt restraining apparatus 12" is fixed to the roof rail 26, not to the pillar 24. Further, the seatbelt retractor 82 is hidden within the roof rail 26.

Fifth Embodiment

Figure 12:
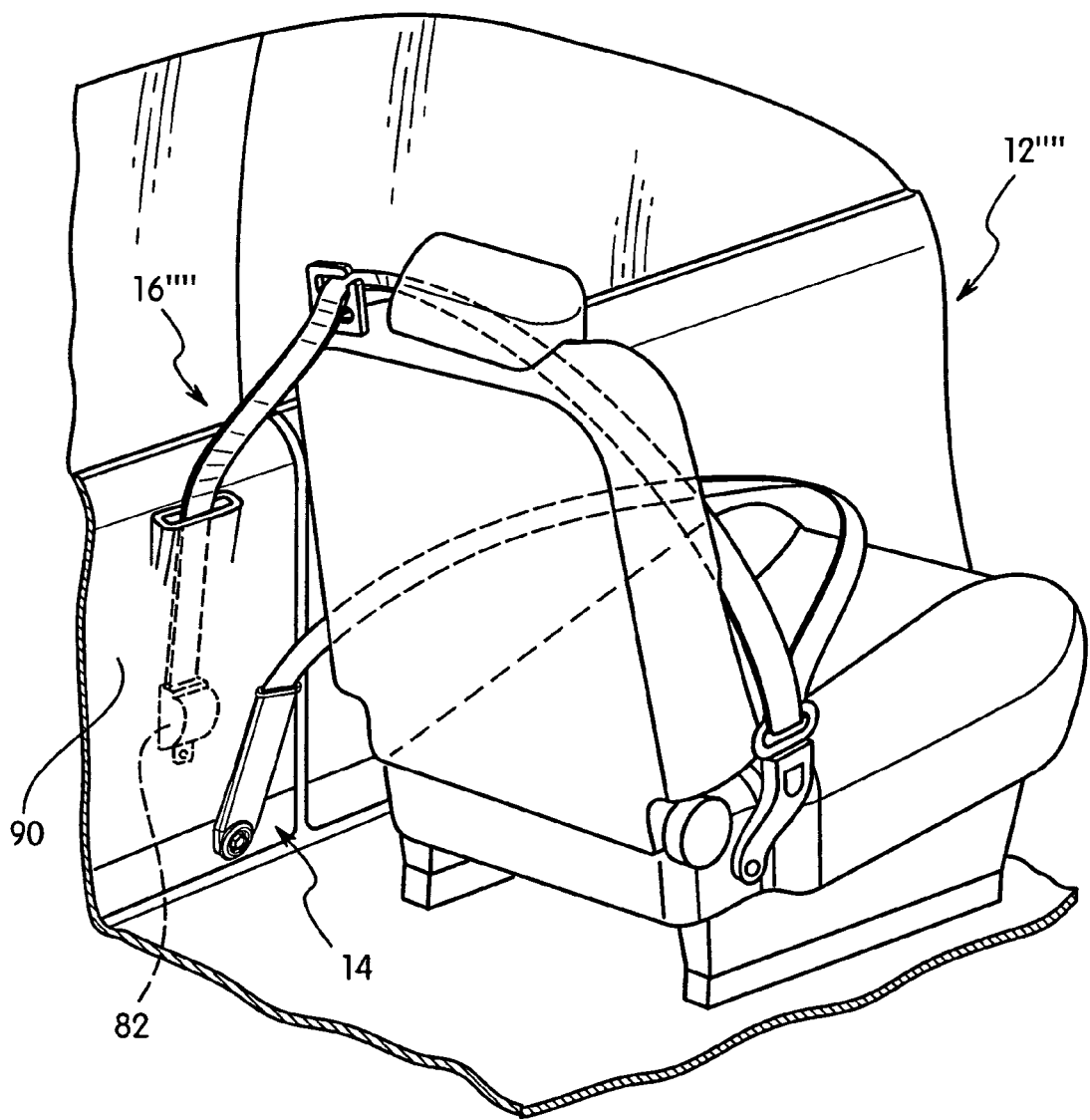
FIG. 12 is a partial rear perspective view of the seatbelt restraining apparatus showing attachment between a side wall portion of the vehicle and the upper section of the seatbelt restraining apparatus in accordance with a fifth embodiment of the present invention.

Referring now to FIG. 12, a vehicle seatbelt restraining apparatus 12'''' in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. The parts of the fifth embodiment that differ from the parts of the first embodiment will be indicated with a quadruple prime ('''').

In the fifth embodiment, an upper section 16'''' of the vehicle seatbelt restraining apparatus 12'''' is fixed to a side wall 90 of the vehicle 10. Further, the seatbelt retractor 82 is hidden within the side wall 90.

The remaining portions of the vehicle 10 are conventional components that are well known in the art. Since vehicles 10 are well known in the art, these structures will not be discussed or illustrated in detail herein. Rather, it will be apparent to those skilled in the art from this disclosure that the components can be any type of structure and/or programming that can be used to carry out the present invention.

As used herein to describe the above embodiment(s), the following directional terms "inboard, outboard, forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle seatbelt restraining apparatus comprising:
   a lower seatbelt anchor having a first seatbelt attachment portion and a mounting portion to be mounted to a lower vehicle portion of a vehicle structure;
   an upper seatbelt anchor configured and arranged to be mounted to an upper vehicle portion of the vehicle structure;
   an elongated seatbelt webbing having a first end coupled to the first seatbelt attachment portion of the seatbelt anchor, and a second end coupled to the upper seatbelt anchor;
   a latch plate movably coupled to the seatbelt webbing in an area spaced apart from the first seatbelt attachment portion while the lower and upper belt anchors are attached to the first and second ends of the seatbelt webbing, respectively, and configured to be coupled to a seat belt buckle;
   a biasing element operatively coupled between the lower seatbelt anchor and the lower vehicle portion to urge the seatbelt anchor in a rotational direction about the pivot axis from a passenger securing orientation to a retracted non-use orientation relative to the lower vehicle portion.

2. The seatbelt restraining apparatus as set forth in claim 1, further comprising
   a spring mounting member being arranged and configured to non-rotatable engage the lower vehicle portion and to retain a part of the biasing element thereon.

3. The vehicle seatbelt restraining apparatus as set forth in claim 2, wherein
   the biasing element is a coil spring including a coiled portion configured to be disposed on a fastener.

4. The vehicle seatbelt restraining apparatus as set forth in claim 2, wherein
   the spring mounting member has a generally planar body portion with a mounting opening configured to have a fastener extend therethrough, and a protrusion extending from the body portion, the protrusion angularly offset from the body portion such that the protrusion is configured to be non-rotatably engaged with the lower vehicle portion.

5. The vehicle seatbelt restraining apparatus as set forth in claim 1, further comprising:

a webbing sleeve fitted over the seatbelt anchor and a portion of seatbelt webbing.

6. The vehicle seatbelt restraining apparatus as set forth in claim 1, wherein
the biasing element is a coil spring including a coiled portion configured to be disposed on a fastener, a first end operatively engaged with the lower seatbelt anchor, and a second end configured to be operatively engaged with the lower vehicle portion.

7. The vehicle seatbelt restraining apparatus as set forth in claim 1, wherein
the upper seatbelt anchor includes a seatbelt retractor connected to the second end of the seatbelt webbing.

8. A vehicle seatbelt restraining apparatus comprising:
a vehicle structure including a lower vehicle portion and an upper vehicle portion;
a vehicle seat mounted to the lower vehicle portion;
a lower seatbelt anchor pivotally coupled to the lower vehicle portion on an outboard side of the vehicle seat to move between a passenger securing orientation and a retracted non-use orientation;
an upper seatbelt anchor mounted to the upper vehicle portion on the outboard side of the vehicle seat;
a seatbelt buckle disposed on an inboard side of the vehicle seat;
a seatbelt webbing having a first end coupled to the lower seatbelt anchor and a second end coupled to the upper seatbelt anchor;
a latch plate coupled to the seatbelt webbing to selectively engage the seatbelt buckle; and
a biasing element operatively coupled to the lower seatbelt anchor to urge the lower seatbelt anchor into the retracted non-use orientation.

9. A vehicle seatbelt restraining apparatus comprising:
a vehicle structure including a lower vehicle portion and an upper vehicle portion;
a lower seatbelt anchor pivotally coupled to the lower vehicle portion to move between a passenger securing orientation and a retracted non-use orientation;
an upper seatbelt anchor configured and arranged to be mounted to the upper vehicle portion;
a seatbelt webbing having a first end coupled to the lower seatbelt anchor and a second end coupled to the upper seatbelt anchor;
a biasing element operatively coupled to the lower seatbelt anchor to urge the lower seatbelt anchor into the retracted non-use orientation; and
the lower vehicle portion including a vehicle sill and a vehicle floor structure, with the lower seatbelt anchor being pivotally coupled to one of the vehicle sill and the vehicle floor structure.

10. The vehicle seatbelt restraining apparatus as set forth in claim 9, wherein
the upper vehicle portion includes a generally upright pillar extending upward from the vehicle sill with the upper seatbelt anchor coupled to the pillar.

11. The vehicle seatbelt restraining apparatus as set forth in claim 9, wherein
the upper vehicle portion includes a side roof rail with the upper seatbelt anchor coupled to the side roof rail.

12. The vehicle seatbelt restraining apparatus as set forth in claim 9, wherein
the upper vehicle portion includes an upper seat back extending upward from the vehicle floor structure, with the upper seatbelt anchor coupled to the upper seat back.

13. The vehicle seatbelt restraining apparatus as set forth in claim 9, wherein
the lower seatbelt anchor is configured and arranged to be substantially aligned with the pillar when in the retracted non-use orientation.

14. The vehicle seatbelt restraining apparatus as set forth in claim 8, further comprising
a spring mounting member being non-rotatably coupled to the lower vehicle portion, with the biasing element being operatively disposed between the spring mounting member and the lower seatbelt anchor.

15. The vehicle seatbelt restraining apparatus as set forth in claim 14, wherein
the spring mounting member has a generally planar body portion with a mounting opening having a fastener extending therethrough and a protrusion extending from the body portion, the protrusion being angularly offset from the body portion such that the protrusion non-rotatably engages a portion of the lower vehicle portion.

16. The vehicle seatbelt restraining apparatus as set forth in claim 15, wherein
the biasing element is a coil spring including a coiled portion disposed on the fastener, a first end operatively engaged with the lower seatbelt anchor, and a second end operatively engaged with the lower vehicle portion.

17. The vehicle seatbelt restraining apparatus as set forth in claim 8, further comprising
a webbing sleeve fitted over the lower seatbelt anchor and a portion of the seatbelt webbing.

18. The vehicle seatbelt restraining apparatus as set forth in claim 8 wherein
the upper seatbelt anchor includes a seatbelt retractor connected to the second end of the seatbelt webbing.

19. The vehicle seatbelt restraining apparatus as set forth in claim 9, wherein
the floor structure includes a floor with a projection extending upwardly from the floor to support a vehicle seat with the biasing element being connected to the projection of the floor.

20. The vehicle seatbelt restraining apparatus as set forth in claim 9, wherein
the biasing element is attached to an outboard side wall of the projection.

21. The vehicle seatbelt restraining apparatus as set forth in claim 9, wherein
the lower seatbelt anchor is pivotally attached to the vehicle sill.

22. The vehicle seatbelt restraining apparatus as set forth in claim 9, wherein
the lower seatbelt anchor is pivotally attached to the vehicle floor structure.

* * * * *